United States Patent [19]

Ohnishi et al.

[11] 3,946,380

[45] Mar. 23, 1976

[54] REMOTE SUPERVISION AND CONTROL SYSTEM

[75] Inventors: Kazuaki Ohnishi, Osaka; Katsuhiro Ohnuki, Sakai, both of Japan

[73] Assignee: Matsushita Electric Works, Ltd., Osaka, Japan

[22] Filed: Nov. 26, 1974

[21] Appl. No.: 527,209

[30] Foreign Application Priority Data
Nov. 30, 1973 Japan.............................. 48-136355

[52] U.S. Cl. ................. 340/409; 340/413; 340/163
[51] Int. Cl.² ......................................... G08B 29/00
[58] Field of Search........ 340/409, 413, 171 R, 151, 340/163, 408

[56] References Cited
UNITED STATES PATENTS
3,689,887  9/1972  La Falce ....................... 340/409 X
3,735,396  5/1973  Getchell ......................... 340/409 X

*Primary Examiner*—Harold I. Pitts
*Attorney, Agent, or Firm*—Wolfe, Hubbard, Leydig, Voit & Osann, Ltd.

[57] ABSTRACT

A system of remote supervising and controlling many console units or equipments associated therewith with a central supervision and control unit. Console units are connected in parallel to the central unit through a single output line comprising a group of wires from the central unit, series signals of clock, data and other pulses are transmitted from the central unit to the respective console units, and signals informing whether the state in the respective console units is normal or not and results of detections of the respective equipments are returned from the console units to the central unit through a signal line in the group of wires.

14 Claims, 7 Drawing Figures

3,946,380

REMOTE SUPERVISION AND CONTROL SYSTEM

BACKGROUND OF THE INVENTION

1. Field of the Invention

This invention relates to a remote supervision and control system.

2. Description of the Prior Art

Conventional systems for supervising and controlling from a remote place between, for example, a central supervision unit and a plurality of console units can be largely classified into the following systems: (1) a polarized signal system wherein one connecting line is alloted to each object to be supervised and controlled in addition to two common lines and the kind of signal is discriminated by the polarity of the voltage impressed on the connecting line, (2) a synchronous selection system wherein an orderly sequence is provided for objects to be controlled and the objects to be controlled are synchronously switched in turn by pulses sent through a common connecting line to control and supervise the objective units, (3) a pulse code system wherein pulses are sent out through a common connecting line and the kind of signal is judged by the number of the pulses, different pulses combined in them or stop of the pulses to control or supervise the units, (4) a frequency system wherein signals of different frequencies are oscillated, sent out through a common connecting line and judged by using a frequency filter to control and supervise the units, and so on. However, each system has its own merits and demerits.

SUMMARY OF THE INVENTION

In the present invention, (a) the address detection is made by the pulse code system and the control and supervision are made by the synchronizing system so that the merits of both systems will be utilized and the supervision and control are made by clock signals from the central supervision unit so that no signal transmitting means to the central supervision unit will be required within the console unit and the unit and the whole system will be simplified, (b) any misoperation is prevented only by the operation of a noise checking circuit in the console unit subjected to two kinds of clock pulses so that it will not be necessary to insert such complicated circuit as by a parity check or twice repeated references into the console unit, (c) an accident detector is provided in the console unit so that, in case any accident is caused, the location of the accident will be able to be easily judged, the maintenance will be simplified and a proper treatment will be possible, (d) as the information is transmitted by series pulses connecting the address detection and control and supervision, the information transmitting speed is lower than those of the pulse code system and parallel transmission system but, as the supervision and control are made in the same period, the information transmitting speed may be made low and (e) the respective console units are connected through one cable containing required number of wires so that the wiring will be simplified and the amount of use of the cable will be saved.

A main object of the present invention is to provide a remote supervision and control system simplifying a central supervision unit and console units and high in the reliability.

Another object of the present invention is to provide a remote supervision and control system wherein troubles by noises present in the communication cable are eliminated.

A further object of the present invention is to provide a remote supervision and control system wherein the operating states of console units are reported to a central supervision unit.

Another object of the present invention is to provide a remote supervision and control system wherein the electric power consumption is small.

The present invention shall now be explained in detail with reference to preferred embodiments shown in attached drawings.

DESCRIPTION OF THE PREFERRED EMBODIMENTS

Figures 1, 2:
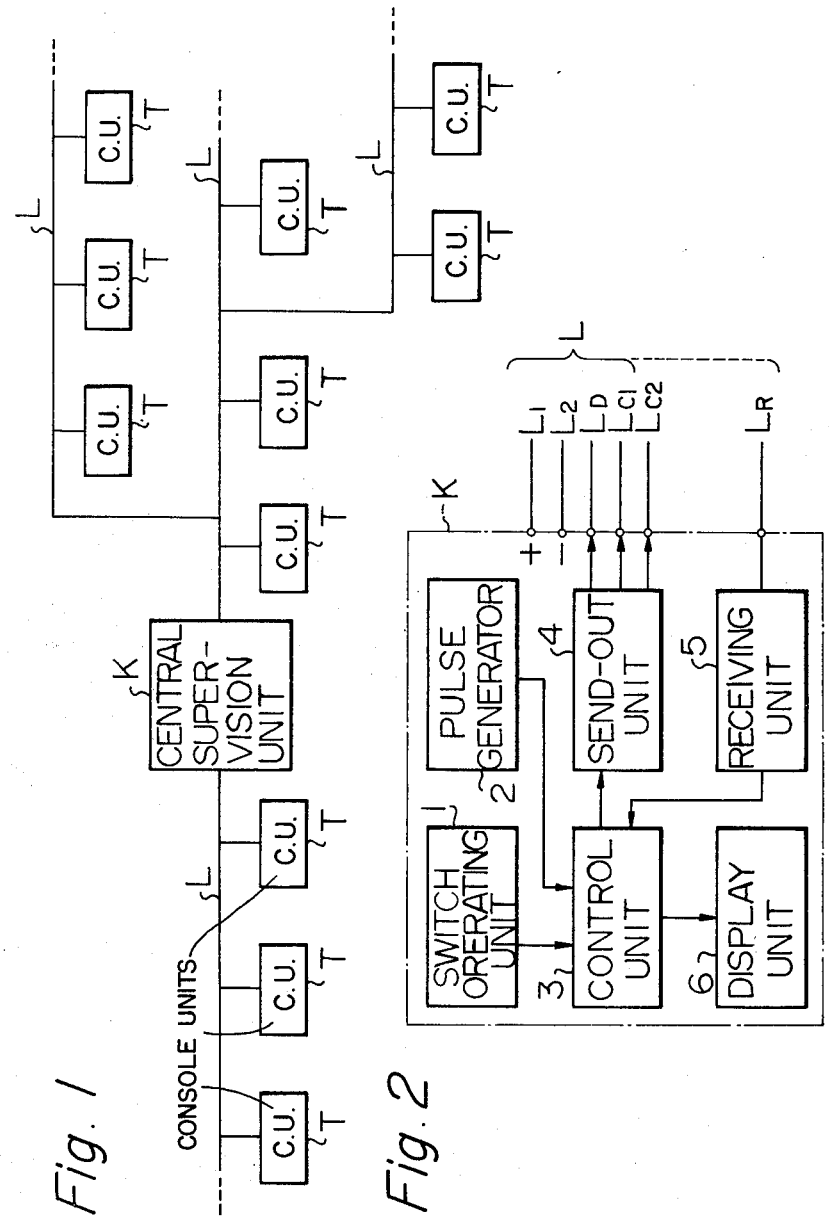
FIG. 1 is a schematic block diagram of a remote supervision and control system of the present invention.
FIG. 2 is a block diagram of a central supervision unit used in the system of the present invention.

Referring briefly to the remote supervision and control system of the present invention reference to FIG. 1, a central supervision unit K of the system is provided with a plurality of console units T connected thereto through cables L.

In FIG. 2 showing a block diagram of the central supervision unit used in the system according to the present invention, 1 is a switch operating unit in which a switch is manually or automatically operated, pulses from a clock pulse generator 2 generating pulses at fixed periods are given to a control unit 3, outputs from said control unit 3 are given to a send-out unit 4, data pulses, first clock pulses and second clock pulses are sent out respectively through lines $L_D$, $L_{C1}$ and $L_{C2}$, reply pulses (pulses showing information from detectors provided in the console units) are given to a receiving unit 5 through a reply pulse line $L_R$, this infomation is given to a display unit 6 through a control unit 3 to make a fixed display and $L_1$ and $L_2$ are respectively + and − current source lines.

Figure 3:
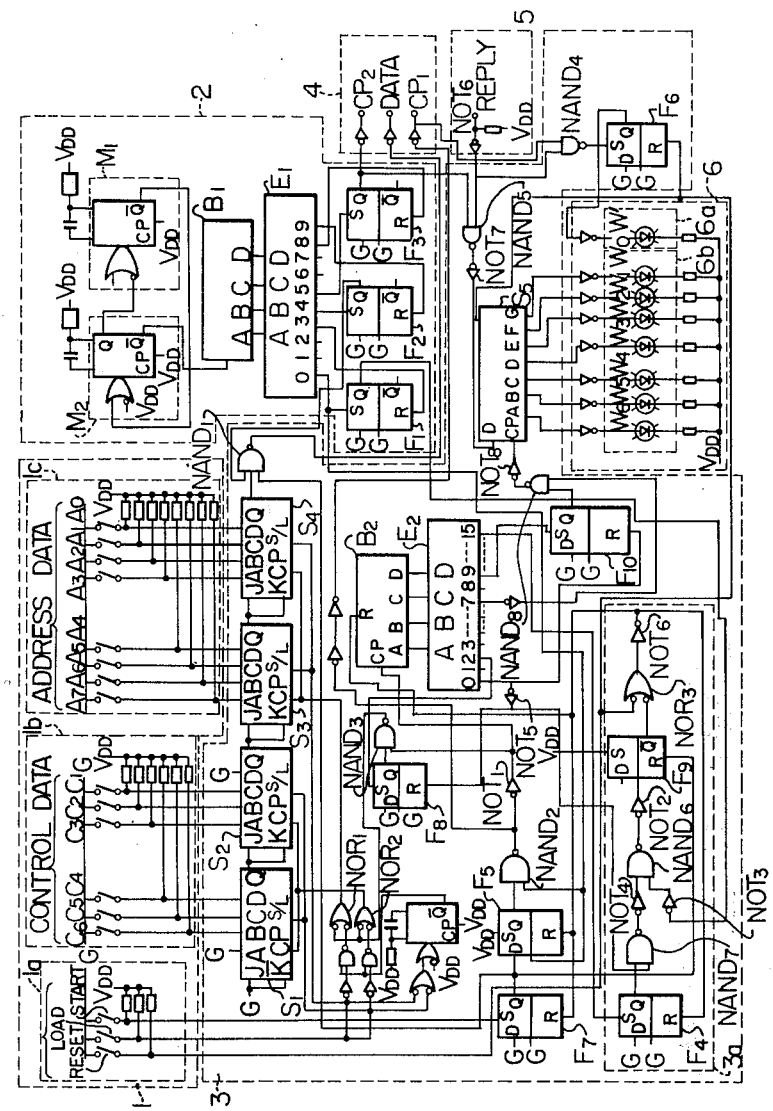
FIG. 3 is an example of circuitry diagram showing in detail of respective parts of the central supervision unit of the present invention.

Referring next to an embodiment as shown in FIG. 3 of the central supervision unit, the switch operating unit 1 consists of an operation ordering unit 1a, data setting unit 1b and address data setting unit 1c which are operated by an external computer. The operation ordering unit 1a is provided with switches "Reset", "Load" and "Start". The control data setting unit 1b is provided with six switches $C_1$ to $C_6$. The address data setting unit 1c is provided with eight switches $A_0$ to $A_7$.

The pulse generator 2 is provided with two monostable multivibrators $M_1$ and $M_2$, a binary counter $B_1$, a decoder $E_1$ and flip-flops $F_1$, $F_2$, $F_3$ and so on. A pulse generator is formed of the monostable multivibrators $M_1$ and $M_2$. The output of this pulse generator is given to a binary counter $B_1$ and the output of the binary counter $B_1$ is given to the decoder $E_1$. The flip-flops $F_1$, $F_2$ and $F_3$ are driven with the output of the decoder $E_1$.

The control unit 3 is provided with shift registers $S_1$ to $S_5$, flip-flops $F_4$ to $F_{10}$, a binary counter $B_2$, a decoder $E_2$ and NAND-circuits 1 to 8. The terminals A, B, C and D of the shift register $S_1$ are connected respectively with the ground and switches $C_6$ $C_5$ and $C_4$ of the control data setting unit 1b and the terminals J and $\overline{K}$ are connected with the ground. The terminals A, B, C and D of the shift register $S_2$ are connected respectively with the switches $C_3$, $C_2$ and $C_1$ of the control data setting unit 1b and the ground and the terminals J and $\overline{K}$ are connected with the terminal Q of the shift register $S_1$. The terminals A, B, C and D of the shift register $S_3$ are connected respectively with the switches $A_7$, $A_6$, $A_5$ and $A_4$ of the address data setting unit 1c and the terminals J and $\overline{K}$ are connected with the terminal Q of the shift register $S_2$. The terminals A, B, C and D of the shift register $S_4$ are connected respectively with the switches $A_3$, $A_2$, $A_1$ and $A_0$ of the address data setting unit 1c and the terminals J and $\overline{K}$ are connected with the terminal Q of the shift register $S_3$. The terminal Q of the shift register $S_4$ is connected with one input terminal of NAND 1. The other input of NAND 1 is connected with the terminal Q of the flip-flop $F_2$ of the pulse generating part 2. The remaining input is connected with the terminal Q of the flip-flop $F_7$.

One input of NOR 3 in the circuit 3a for making a vacancy for one pulse in the first clock pulses $CP_1$ is connected with the switch Reset of the operation ordering unit 1a of the switch operating unit 1 and the remaining input is connected with the terminal $\overline{Q}$ of the flip-flop $F_9$. The terminal S of the flip-flop $F_9$ is maintained always at a high level and the terminal R is connected with the terminal Q of the flip-flop $F_7$. The terminal T of the flip-flop $F_9$ is connected with the output terminal of NAND 6 through NOT 2. One input of NAND 6 is connected with the terminal "0" of the decoder $E_1$ through NOT 3 and the remaining input is connected with the output terminal of NAND 7 through NOT 4. One input of NAND 7 is connected with the terminal 0 of the decoder $E_2$ through NOT 5 and the other input is connected with the terminal Q of the flip-flop $F_4$. The terminal S of the flip-flop $F_4$ is connected with the terminal 15 of the decoder $E_2$ and the terminal R is connected with the output terminal of NOR 3 through NOT 6. The output terminal of NOT 6 is further connected with the terminal R of the flip-flop $F_7$, the terminal R of the flip-flop $F_5$ and the reset terminal R of the binary counter $B_2$. The terminal D of the flip-flop $F_5$ is connected with the terminal Q of the flip-flop $F_7$ and the terminal T is connected with the terminal Q of the flip-flop $F_1$. One input terminal of NAND 2 is connected with the terminal Q and the other input terminal is connected with the terminal Q of the flip-flop $F_1$. The output of NAND 2 is connected with the terminal $C_p$ of the binary counter $B_2$ through NOT 1 and, in addition, with the terminal $CP_1$ of the send-out unit 4 through the circuit NOT.

The terminals $CP_1$ and DATA of the transmitter 4 are wired as mentioned above and the terminal $CP_2$ is connected with the terminal Q of the flip-flop $F_3$ through the circuit NOT.

The terminal REPLY of the receiving unit 5 is connected with the input terminal of each of NAND 4 and NAND 5 of the controlling unit 3 through NOT 6, the other input of NAND 4 is connected with the terminal $CP_1$ of the send-out unit 4 and the other input of NAND 5 is connected with the terminal Q of the flip-flop $F_3$. The output of NAND 4 is connected with the terminal S of the flip-flop 6. The terminal R of the flip-flop 6 is connected with the terminal Reset of the operation ordering unit 1a of the switch control unit 1. The terminal Q is connected with the noise displaying element W' of the display unit 6 through the circuit NOT. The output of NAND 5 is connected with the shift register $S_5$ through NOT 7.

The terminal $C_P$ of the shift register $S_5$ is connected with the output of NAND 8 through NOT 8, one input of NAND 8 is connected with the terminal Q of the flip-flop $F_{10}$ and the other input is connected with the terminal 7 of the decoder $E_2$. The terminal S of the flip-flop $F_{10}$ is connected with the terminal 9 of the decoder $E_2$ and the terminal R is connected with the terminal 0 of the decoder $E_2$. The terminal Reset of the shift register $S_5$ is connected with the switch Reset of the operation ordering unit 1a of the switch control unit 1. The output terminals A, B, C, D, E, F and G of the shift register $S_5$ are connected respectively with the displaying elements $W_6$, $W_5$, $W_4$, $W_3$, $W_2$, $W_1$ and $W_0$ of a console accident display unit 6b through the circuits NOT.

It will be appreciated that, if this console accident display unit 6b is assembled in a matrix type in such manner that a row of the six displaying elements are arranged as one set with respect to one console unit, another row of the six displaying elements are also arranged as another set with respect to another console unit and so on, it is made possible to easily identify at a glance the location of an accident, that is, in which particular detecting element of which particular console unit there occurring the accident. The reference to the embodiment here shall proceed, however, with reference to one set of the six displaying elements as described in the foregoing, for the purpose of simplicity and clarity.

The operation shall be explained in the following. First of all, a resetting signal is given to the switch Reset of the operation ordering unit 1a of the switch operating unit 1 to reset the flip-flops $F_4$, $F_5$, $F_6$ and $F_7$, binary counter $B_2$ and shift register $S_5$ in the control unit 3.

Then a loading signal is given to the switch Load of the operation ordering unit 1a of the switch operating unit 1, the inputs S/L of the shift registers $S_1$, $S_2$, $S_3$ and $S_4$ of the control unit 3 are made to be of a low level and the control data set in the control data setting unit 1b and the address data set in the address data setting unit 1c in the switch operating unit 1 are read into the shift registers $S_1$, $S_2$, $S_3$ and $S_4$.

Then a starting signal is given to the switch Start of the operation ordering unit 1a of the switch operating unit 1, the input S of the flip-flop $F_7$ of the control unit 3 is made to be of a low level and the output Q is made to be of a high level so that one input of NAND 1 will be always held at a high level. When the output Q of the flip-flop $F_2$ coincides with the outputs from the shift registers $S_4$, $S_3$, $S_2$ and $S_1$, a high level will appear at the terminal DATA of the send-out unit 4 and, when it does not coincide, a low level will appear.

The output Q of the flip-flop $F_1$ is given to NAND 2 of the flip-flop $F_5$ and is transmitted to the terminal $CP_1$ of the send-out unit 4 through three NOT circuits. At this time, the output of NAND 2 will be given to the binary counter $B_2$ through NOT 1 and a vacancy will be made at the bit 16th from the first of the pulses of $CP_1$ by the circuit 3a through the decoder $E_2$.

The output Q of the flip-flop $F_3$ will be transmitted to the terminal $CP_2$ of the send-out unit 4.

Now, when information showing that a noise is present is transmitted to the receiving unit 5 through the reply line $L_R$, NAND 4 will be set ON, the output Q of the flip-flop $F_6$ will be of a high level and it will be displayed at W' of the display unit 6 that a noise is present.

Any accident in the console units will be transmitted to the receiving unit 5 through the reply line $L_D$. This signal will be given to NAND 5 and NAND 4 through NOT 6 and NAND will be taken with the former between it and the output Q of the flip-flop $F_3$ and with the latter between it and the clock pulse $CP_1$. As a result, the output of NAND 5 will be of a high level and will be transmitted to the shift register $S_5$ through NOT 7. Thereby the accident in the console units will be displayed at the element $W_0$ of the display unit 6. This element $W_0$ is to be lighted on in normal state and lighted off in emergency state.

When a switch means of fire alarm, criminal alarm or the like, for example, a switch $SW_i$ (here $i = 1, 2, \ldots 6$) provided in the send-out unit 110 of the console unit T is set ON, a signal will be sent out onto the reply line $L_R$ through the NAND circuit 148, NOR circuit 146 and OR circuit 128. This confirmation signal will be received by the receiving unit 5 in the central supervision unit and will be displayed at $W_i$ (here $i = 1, 2, \ldots 6$) of the display unit 6. The displaying element $W_i$ is to be lighted off in normal state and lighted on in emergency state, that is, the element $W_i$ will be ON when the switch $SW_i$ is set ON.

Figure 4:
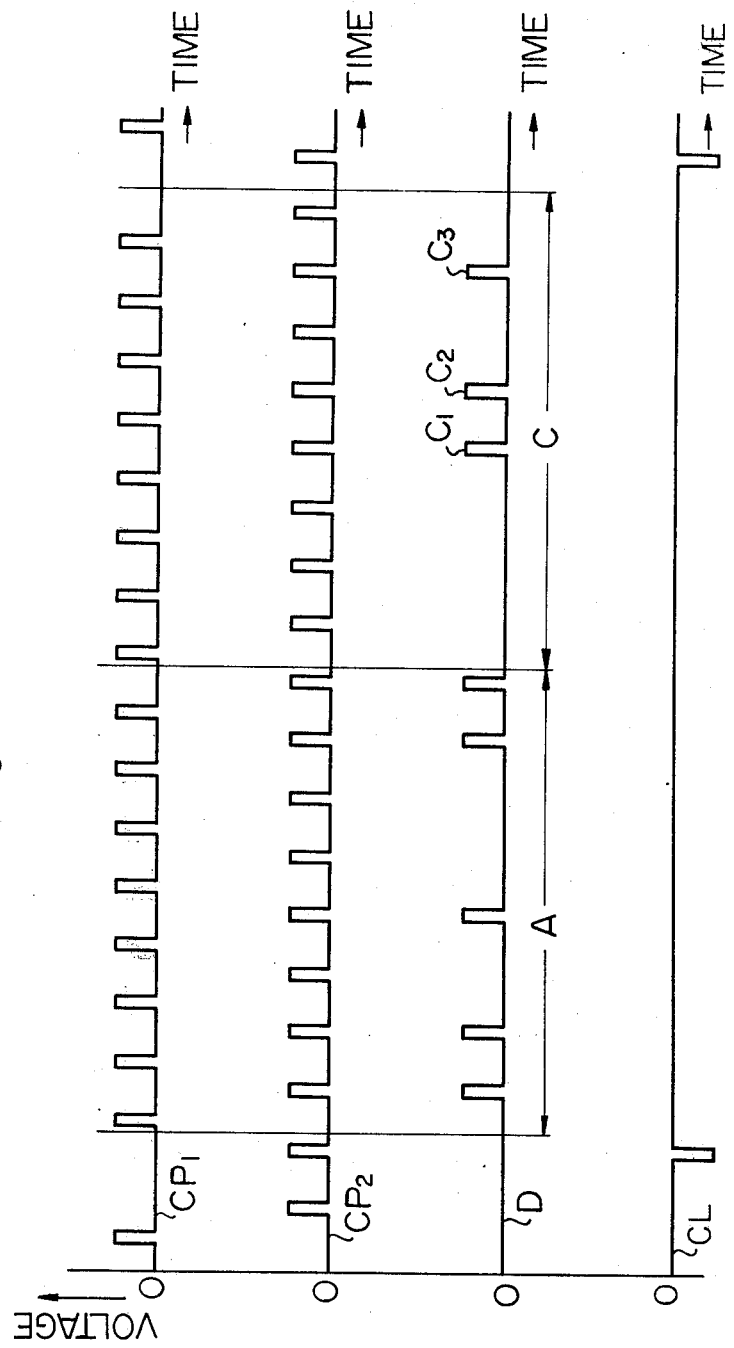
FIG. 4 is a diagram showing first and second clock pulses and data pulses produced by the central supervision unit of FIG. 3 and a clear pulse appearing in console unit used in the system of the present invention shown in FIG. 5 or 6.

In FIG. 4 there are shown wave forms of clock pulses and data pulses used, in which $CP_1$ shows first clock pulses, $CP_2$ shows second clock pulses and D shows data pulses, all having the same cycles. Both of the first clock pulses and second clock pulses are shorter in the on-duty period than in the off-duty period. The second clock pulses $CP_2$ are different from the first clock pulses $CP_1$ by 180° in the phase. The data pulses D are so formed that the on-duty period of the data pulses will be in the off-duty period of the first clock pulses $CP_1$ and in the on-duty period of the second clock pulses $CP_2$. Further, the first clock pulses $CP_1$ have a vacancy for one pulse in the starting position. As shown by the wave form D in FIG. 4, these data pulses are formed of series pulses of an address signal part A and control signal part C. In the illustrated case, the data pulses are formed of 16 bits of which 8 bits are of the address signal part A and 8 bits are of the control signal part C. This control signal part C is to drive and control a buzzer in the fire or criminal alarm device or the like, automatic fire extinguishers or the like units connected with the respective console units. The controlled units of the console units correspond to the respective bits of this control signal part C at a rate of one to one and are switched on and off depending on whether the pulses $C_1, C_2, \ldots$ are in the respective bits or not.

Figure 5:
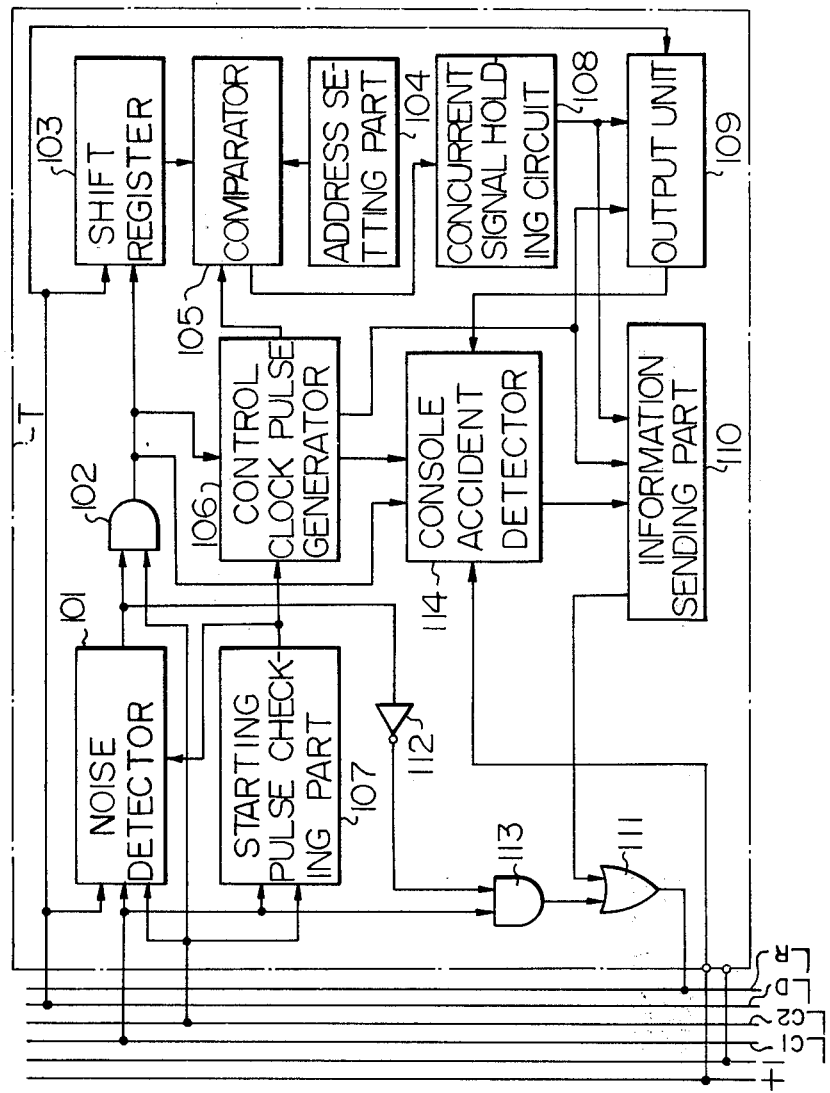
FIG. 5 is a block diagram of a console unit in the present invention.

In FIG. 5 there is shown a block diagram of the console units, in which a noise checking part 101 is so formed as to receive as an input the first clock pulses $CP_1$, second clock pulses $CP_2$ and data pulses D and to detect noises by utilizing the fact that the first clock pulses, second clock pulses and data pulses are different from one another by 180° in the phase. In case there is no noise, the output of a noise detector 101 will be of a high level but, if there is a noise, its output will be of a low level. In case there is no noise, that is, in case the output of the noise detector 101 is in a high level, an AND-gate 102 will pass the second clock pulses to transmit them to a shift register 103, control clock pulse generator 106 and console accident detector 114. In case there is a noise, that is, in case the output of the noise detector 101 is in a low level, the AND-gate 102 will block the second clock pulses so as not to transmit them to the shift register 103 and others. A starting pulse checking unit 107 is to obtain starting pulses from the first clock pulses and second clock pulses by utilizing the vacancy (see $CP_1$ in FIG. 4) in the starting position of the first clock pulses. With these starting pulses, the noise detector 101 is operated and the operation of the control clock pulse generator 106 is started.

The shift register 103 reads in the pulses of the address signal part A in the data pulses D as synchronized with the second clock pulses $CP_2$ and compares the address signal memorized in this shift register 103 and the address set in advance in each console unit by the address setting part 104 (in which the addresses are set manually or automatically in advance) with each other by means of a comparator 105. When these address signal and set address are concurrent with each other, the corresponding console unit will be called out to put the concurrent signal into the concurrent signal holding circuit 108. This concurrent signal holding circuit 108 will produce an output only in case it holds a concurrent signal so that the output unit 109 for driving the units associated with the console units and an information sending part 110 sending out informations from the supervision unit associated with the console units and console accident detector 114 to the reply line $L_R$ can be operated.

The control clock pulse generator 106 counts the number of the second clock pulses from the time of the generation of the starting pulses, produces an output corresponding to each bit in the control signal input period and selects the output unit 109 and information sending part 110 provided respectively so as to correspond to the respective bits in said period. The output unit 109 and information sending part 110 can operate when a concurrent signal is produced by the comparator 105. Then, by the control clock pulse generator 106, a selecting clock signal is produced to show to what bit number in the input period it corresponds and the output unit 109 and information sending part 110 corresponding to said bit are selected. In this selected output unit, when it is selected, if the data pulses are put in through the line $L_D$, said output unit 109 will operate to drive the controlled unit and, if there is no input of the data pulses, said output unit 109 will stop the driving of the controlled unit. Further, in the information sending part 110 selected as mentioned above, information from the detector is sent out as an output signal as synchronized with this timing and this signal is sent out of an OR-gate 111 to the reply line $L_R$ and is received by the central supervision unit K. 112 is an inverter which will produce a signal of a high level when the output signal of the noise detector 101 is inverted to detect a noise. When a high level output is produced in this inverter 112, and AND-gate 113 will open as synchronized with the first clock pulses and the output will be sent back to the central supervision unit K as a noise detecting reply signal through an OR-gate 111. General reply pulses are sychronized with the second clock pulses and are sent back from the input part but the noise detecting reply signals are sent back as synchronized with the first clock pulses. In the central supervision unit K, when an input synchronized with the first clock pulses is produced, a noise will be detected on the console unit side and it will be known that a normal operation is impossible.

114 is a console accident detector to report whether there is an accident in the internal circuits of the console units or not.

Figure 6:
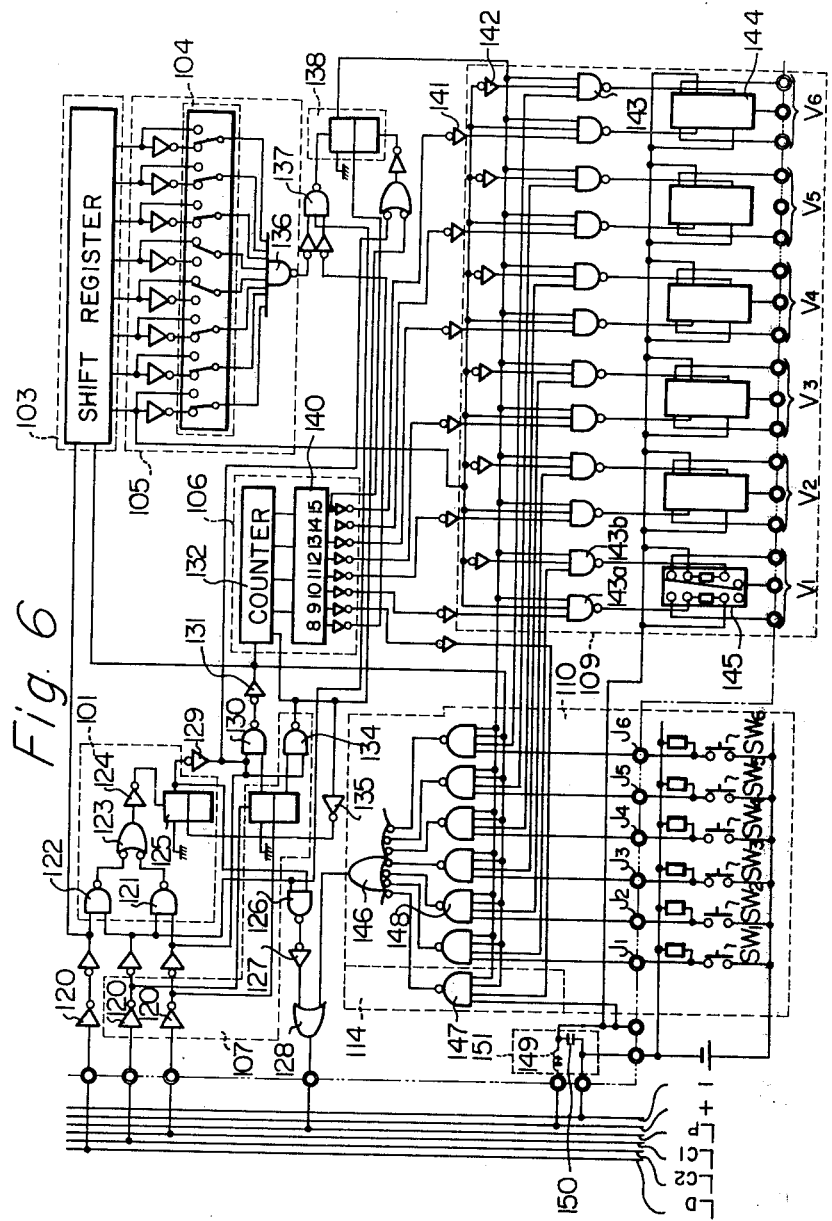
FIG. 6 is an example of practical circuit diagram of the console unit.

FIG. 6 shows an example of practical circuit of console units. Its formation and operation shall be explained.

In the drawing, $L_D$ is a data pulse line, $L_{C1}$ is a first clock pulse line, $L_{C2}$ is a second clock pulse line and $L_R$ is a reply pulse line. + and − show respective current source lines.

Figure 7:
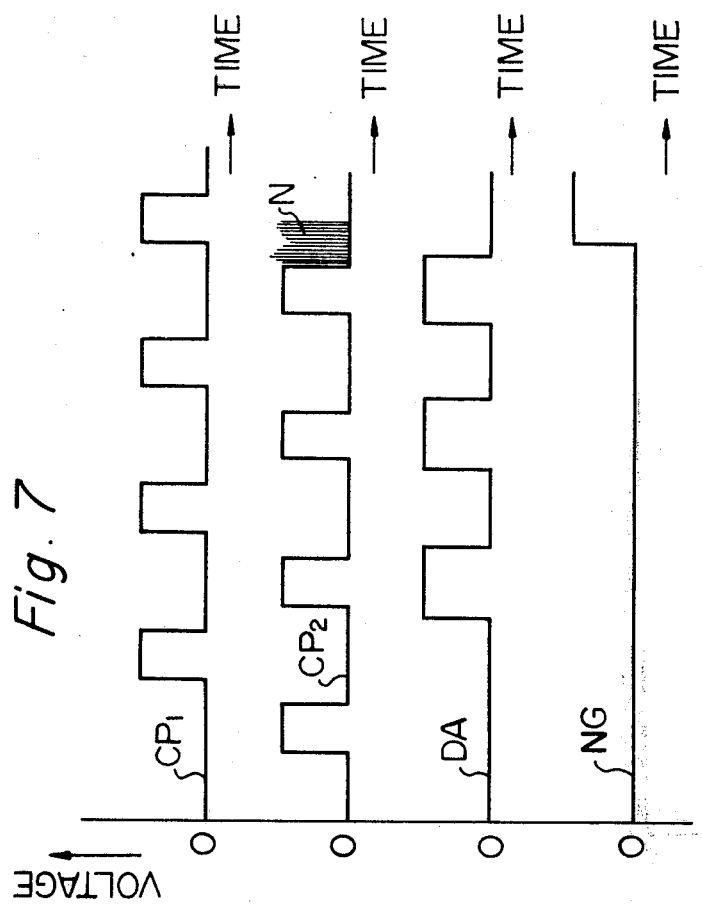
FIG. 7 is a diagram showing voltage wave forms at respective parts in the console unit of FIG. 6 for explaining the operation thereof depending on the presence or absence of noises.

101 is a noise detector which is to detect noises by utilizing the fact that the second clock pulses $CP_2$ and data pulses D are different from the first clock pulses $CP_1$ by 180° in the phase. The first clock pulses $CP_1$ and second clock pulses $CP_2$ are connected with a NAND-gate 121 through an inverter 120 connected respectively in series of two with the data pulse line LD, first clock pulse line $L_{C1}$ and second clock pulse line $L_{C2}$, the data pulses D and first clock pulses $CP_1$ are connected with a NAND-gate 122, the outputs of both NAND-gates 121 and 122 are applied to a NOR-gate 123 and the output of said NOR-gate 123 is connected with a SET terminal S of a noise detecting holding flip-flop 125 through an inverter 124. In case noise pulses N are superimposed on the first clock pulses $CP_1$ or on the second clock pulses $CP_2$ and data pulses D as shown in FIG. 7, the output of the NAND-gate 121 or 122 will become low in the lovel and a low level input will be impressed on the SET terminal S of the flip-flop 125. Therefore, the output Q of the flip-flop 125 will become high in the level and a noise detecting signal NG will be sent back by the timing of the first clock pulses $CP_1$ through the NAND-gate 126, inverter 127 and OR-gate 128 to the reply pulse line $L_R$ and the central supervision unit K will receive this noise detecting signal NG.

On the other hand, in case no noise is detected, the output $\overline{Q}$ of the flip-flop 125 will be in a high level and the output Q will be in a low level. Therefore, this output is inverted by the inverter 129 and is given to the shift register 103 and a binary counter 132 through a NAND-gate 130 and inverter 131.

The starting pulse checking part 107 is formed of a flip-flop 133 and NAND-gate 134 so that, when the first clock pulses $CP_1$ are put into a terminal S of a flip-flop 133 through one inverter 120 and the inverting signal of the first clock pulses $CP_1$ is put in, the output $\overline{Q}$ of said flip-flop 133 will be of a low level but, when the second clock pulses $CP_2$ are put into a terminal T of the flip-flop 133 through one inverter 120 and the inverting signal of the second clock pulses $CP_2$ rises, the output $\overline{Q}$ will be of a high level. The output $\overline{Q}$ of this flip-flop and the second clock pulses $CP_2$ through two series inverters 120 are given to a NAND-gate 134 so that a starting position will be detected from the vacancy (see $CP_1$ in FIG. 4) which the first clock pulses $CP_1$ have and the output of said NAND-gate 134 is given to a terminal CL of a binary counter 132 in the control clock pulse generator 106 as a clearing signal CL (see wave form CL in FIG. 4) by the detection of the starting position and clears the binary counter 132. Further, an inverter input is given to a terminal T of the flip-flop 125 through an inverter 135 to reset an address holding flip-flop 138.

The shift register 103 is synchronized with the second clock pulses $CP_2$ and reads in an address signal of the data pulses D (see FIG. 4). The address signal read in and memorized by this shift register 103 and the set address in the address setting unit 104 set for each console unit T in advance are compared with each other by means of the comparator 105. When these address setting signal and set address are concurrent with each other, a concurrent signal calling out said console unit T will be produced in the comparator 105 and will be given to a terminal S of the flip-flop 138 so as to be held thereby and a high level signal will appear in the terminal Q. While the concurrent signal is being held, the output unit 109 and information sending part 110 can operate. In case the address setting signal and the set address are not concurrent with each other, the output unit 109 and information sending part 110 will not operate. The control clock pulse generator 106 is formed of the binary counter 132 and a decoder 140 so that the number of the second clock pulses $CP_2$ from the time of the generation of the starting pulses will be counted by the binary counter 132 and the output unit 109 and information sending part 110 corresponding to the respective bits in the period in which the control signal is being put in during the data pulses D will be selected. In other words, in this embodiment, the data pulses D are formed of 16 bits and, as shown in FIG. 4, the first 8 bits are of an address signal part and the latter 8 bits are of a control signal part. The above mentioned shift register 103 is formed of 8 bits so that, when the set address set by the address setting part 104 and the output of the shift register 103 are concurrent with each other and further when the output of the decoder 140 is 8, that is, the clock pulse $CP_2$ is the ninth, a NAND-gate 137 will be opened, the flip-flop 138 will be set and said console unit will be placed in a state of being selected.

The clock pulses $CP_2$ are put into the shift register 103 and also into the binary counter 106, counted from the first of the input period of the data pulses D and given as outputs of the respective terminals "9 to 15" by the decoder 140. The period while the output of the decoder 140 is 8 to 15 is a period of a control signal part C. Here, when the output of the decoder 140 is 8, it will be used to hold the information that the address is concurrent. The output 9 is used for checking internal accident of the console unit and with an output of 10 to 15 the control output unit 109 will be operated. With the rise of an output 15, further, the flip-flop 138 is caused to reset.

The output unit 109 comprises inverters 141 and 142, NAND-gate 143 and two-winding latching relay 144 so that a supervision unit (not illustrated) will be operated by the operation of the relay. For example, when the output of the flip-flop 138 memorizing the information of the concurrence of the address is in a high level and the output of the decoder 140 is 10, NAND-gates 143a and 143b will transmit the control signal of the data pulses D to a relay 145.

The information sending part 110 is to send out such supervision state as disaster prevention as reply pulses and comprises a supervision unit having an OR-gate 146, NAND-gate 147 and contacts $SW_i$ ($i = 1, 2, \ldots 6$). When an ON-signal of the contact 148, a high level signal of the flip-flop 138, a signal from the decoder 140 to operate a selected control unit (not illustrated) and the second clock pulses $CP_2$ are simultaneously present, the NAND-gate 147 will send out reply pulses to the reply line $L_R$ through the OR-gate 146.

8 is used to confirm that the flip-flop 138 is held, there is an output of the decoder 140 and the console units are being normally operated by automatically sending a reply signal from the information sending part 110 so that whether there is an accident in the console units or not will be known.

In correspondence with the respective outputs "$j$" ($j + 10, 11, \ldots 15$) from the decoder 140, terminals "$V_1$" ($i = J - 9$) of the output unit 109 are respectively connected with desired supervision units $V_i'$ ($j = j - 9$). However, as this respect is not directly concerned to the subject of the present invention, further details will be omitted here. Futher, the terminal $J_i$ ($i = J - 9$) of the information sending part 110 is connected with a switch $SW_i$ or the like contained in the particular supervision unit $V_i'$ connected with the above output unit terminal $V_i$.

It should be here noted that, provided the console unit T is formed with a number of CMOS elements, it is likely that a state in which many of these CMOS elements will perform switching operation simultaneously so that an excessive current will be caused to flow through the circuit may happen. In this case, therefore, it becomes necessary to use a considerably thicker wire as the current source line. According to the present invention, however, such a circuit 151 as shown, for example, in FIG. 6 comprising a choke coil 149 and condenser 150 connected in L-shape is inserted between the console unit T and the source line, so that any varying current due to such switchings of CMOS elements in the console unit T can be averaged. Consequently the source line may bbe of a thinner wire and, in addition, the consuming power of the console unit T can be made less. Since the flowing current can be averaged, further, any voltage drop in the console unit becomes small so that any misoperation of CMOS elements will be able to be prevented from occuring.

The features of the present invention will be summarized as follows:

i. The data pulses are formed of a series pulse row of an address signal part and control signal part and the address signal part is formed of combined theoretical series pulses so that, through the required data line is one line, a large number of console units can be freely selected.

ii. The control output elements are made to correspond to the respective clock pulse positions in the control signal part's input period following the address signal part so as to be controlled by the state of the control signal pulses of the control signal part, so that informations will be transmitted depending only on whether the control signal pulses of the control signal part are in a high level or a low level, a separate coding signal converting circuit or the like will not be required and the circuit formation will be made simple.

iii. The first clock pulses consisting of pulses at regular intervals and the second clock pulses in a phase different by 180 degrees from that of the first clock pulses are transmitted through separate transmitting lines so that they will not be superimposed on each other and a noise detecting output will be produced when the input ingnals through these lines are superimposed on each other and, therefore, any noise can be positively detected with a simple circuit.

iv. A reply pulse (information) sending part is provided so that equipments associated with the console units will be controlled and at the time the result of the supervision can be known by the central supervision unit.

v. As a circuit for averaging varying currents is inserted in the console units, the current source line may be of a thinner wire and the consuming power can be made less.

What is claimed is:

1. A system for supervising and controlling remote equipment comprising in combination, a central supervision unit, a plurality of console units associated with the respective equipment to be controlled and supervised, a clock pulse line, a data pulse line, a reply pulse line, said lines coupling said supervision unit to said console units; said central supervision unit including means for sending out a series of clock pulses on said clock pulse line, means for sending out a series of data pulses on said data pulse line, said data pulses including an address signal part and a control signal part, each of said parts including a plurality of data pulses, and means for receiving a series of reply pulses from said reply pulse line; each of said console units comprising a shift register for storing data pulses, an address setting part in which an address assigned to the console unit is preset, a comparator for comparing the data pulses within said register with the address assigned by said address setting part and for producing a concurrent signal when the address signal part of said data pulses corresponds with said assigned address, a control pulse generator for counting said clock pulses and for generating control pulses synchronized with said clock pulses, output means responsive to said comparator said control pulse generator and said data pulses for sequentially directing data pulses within said control signal part to associated equipment in the presence of a concurrent signal, and sending means responsive to said comparator said control pulse generator and signals from associated equipment for sequentially sending reply pulses on said reply pulse line to said central supervision unit in the presence of a concurrent signal, whereby an addressed console unit responds synchronously to the control part of the data pulses after detection of the address assigned thereto.

2. A system for supervising and controlling remote equipment comprising in combination, a central supervision unit, a plurality of console units associated with the respective equipment to be controlled and supervised, first and second clock pulse lines, a data pulse line, a reply pulse line, said lines coupling said central supervision unit to said console units; said central supervision unit including means for sending out a series of first clock pulses on said first clock pulse line and a series of second clock pulses on said second clock pulse line, said first clock pulses being of regular interval and having an on-duty period which is shorter than the off-duty period thereof, said second clock pulses having the same frequency as said first clock pulses and being shifted in phase by 180° from said first clock pulses, means for sending out a series of data pulses on said data pulse line, said data pulses having an address part and a control part, each of said parts including a plurality of data pulses, said data pulses having an on-duty period within the on-duty period of said second clock pulses, and means for receiving reply pulses from said reply pulse line; each of said console units comprising a shift register for storing data pulses, an address setting part in which an address assigned to the console unit is preset, a comparator for comparing the data pulses within said register with the address assigned by said address setting part and for producing a concurrent signal when the address part of said data pulses corresponds with said assigned address, a control pulse generator for counting the second clock pulses and generating control pulses synchronized with said second clock pulses, output means responsive to said comparator said control pulse generator and said data pulses for sequentially directing data pulses within said control part to associated equipment in the presence of a concurrent signal, and sending means responsive to said comparator said control pulse generator and signals from associated equipment for sequentially sending reply pulses on said reply pulse line to said central supervision unit in the presence of a concurrent signal, whereby an addressed console unit responds synchronously to the control part of the data pulses after detection of its assigned address.

3. The system as set forth in claim 2 wherein the control pulse generator includes a counter for counting said second clock pulses and a decoder coupler to the counter, said decoder having outputs selectively energized in dependence upon the number of clock pulses counted by said counter, said decoder outputs being coupled to both said output means and said sending means whereby control and supervision is accomplished simultaneously.

4. The system as set forth in claim 3 wherein said output means comprises a plurality of like output circuits associated with respective units of equipment to be controlled, said sending means comprising a plurality of like sending circuits corresponding to respective units of equipment to be supervised, each of said decoder outputs being coupled to an associated output circuit and sending circuit.

5. The system as set forth in claim 4 wherein each of said output circuits comprises gating means responsive to said concurrent signal, said decoder and said data pulses; and two-winding latching relay means driven by said gating means for controlling the associated unit of equipment.

6. The system as set forth in claim 2 wherein each of said console units includes a noise detecting circuit responsive to said first clock pulses, said second clock pulses and said data pulses; said noise detecting circuit including means for detecting phase errors between said pulses; and means responsive to the noise detecting circuit for disabling the binary counter within said control pulse generator and sending a noise generation signal to said central supervision unit for indicating the presence of noise.

7. The system as set forth in claim 6 wherein said noise detecting circuit comprises a first NAND circuit to which said first clock pulses and data pulses are fed as inputs, a second NAND circuit to which said first clock pulses and second clock pulses are fed as inputs, a NOR circuit to which outputs of said first and second NAND circuits are fed, a NOT circuit to which the output of said NOR circuit is fed and a flip-flop to which the output of said NOT circuit is fed.

8. The system as set forth in claim 3 wherein said central supervision unit includes means for creating a vacancy of one pulse in the first clock pulse series indicating the start of a message, each of said console units including start detector means responsive to said pulse vacancy for resetting the binary counter to initiate reception of a data pulse series.

9. The system as set forth in claim 8 wherein said start detector means comprises a flip-flop coupled to said first clock pulses and said second clock pulses, and gating means coupling said flip-flop and said second clock pulses to said counter so that the first pulse vacancy serves to reset said counter and cause said counter to count succeeding second clock pulses.

10. The system as set forth in claim 9 wherein said start detector circuit comprises a first NOT circuit to which said first clock pulses are fed as an input, a second NOT circuit to which said second clock pulses are fed as an input, a flip-flop to which the output of said first NOT circuit is fed as a set input and the output of said second NOT circuit is fed as a trigger input, and a NAND circuit to which one output of said flip-flop and the second clock pulses are fed as an input.

11. The system as set forth in claim 2 wherein each of said console units includes a console accident detector operative upon said sending means to return a signal to said central supervision unit indicating the operating condition at said console unit.

12. The system as set forth in claim 2 wherein said shift register contains the same number of stages as the number of bits withing the address part of the data pulses.

13. The system as set forth in claim 2 wherein said central supervision unit comprises a switch operating unit including an operation ordering unit, a control data setting unit, and an address data setting unit; a pulse generator; a control unit having a plurality of shift registers; means coupling said switch operating unit to said shift registers for reading the information within said switch operating unit into said shift registers; means coupling said pulse generator to said shift register for serially shifting pulses from said shift register; a circuit for making a one pulse vacancy in the first clock pulses indicating the start of a message; a sendout unit for sending out said data pulses, first clock pulses and second clock pulses to the console unit; a receiving unit for receiving reply signals from the console units; and a display unit responsive to said reply pulses to display the supervised conditions at said console units.

14. The system as set forth in claim 2 wherein said console units are powered from a current source coupled to said console units through an energy storing impedance, said impedance comprising a choke coil and a condenser coupled in an L configuration for averaging the power supplied to said console unit.

* * * * *